United States Patent
Ghabra et al.

(10) Patent No.: US 6,819,229 B2
(45) Date of Patent: Nov. 16, 2004

(54) COUNTERMEASURE SYSTEM AND METHOD FOR VEHICLE PASSIVE ENTRY SYSTEM

(75) Inventors: Riad Ghabra, Dearborn Heights, MI (US); John S. Nantz, Brighton, MI (US); Qingfeng Tang, Novj, MI (US)

(73) Assignee: Lear Corporation, Southfield, MI (US)

( * ) Notice: Subject to any disclaimer, the term of this patent is extended or adjusted under 35 U.S.C. 154(b) by 19 days.

(21) Appl. No.: 10/325,302

(22) Filed: Dec. 20, 2002

(65) Prior Publication Data

US 2003/0222757 A1 Dec. 4, 2003

Related U.S. Application Data

(60) Provisional application No. 60/385,307, filed on Jun. 3, 2002.

(51) Int. Cl.[7] .............................................. B60R 25/10
(52) U.S. Cl. .............................. 340/426.36; 340/426.3; 340/426.28; 307/10.3
(58) Field of Search .................... 340/426.36, 426.3, 340/426.28, 426.25; 307/10.2, 10.3, 10.6

(56) References Cited

U.S. PATENT DOCUMENTS

| | | |
|---|---|---|
| 4,477,874 A | 10/1984 | Ikuta et al. |
| 4,638,292 A | 1/1987 | Mochida et al. |
| 5,204,672 A | 4/1993 | Brooks |
| 5,432,495 A | 7/1995 | Tompkins |
| 5,525,977 A | 6/1996 | Suman |
| 5,583,486 A * | 12/1996 | Kersten ................... 340/572.1 |
| 5,602,426 A | 2/1997 | Ecker |
| 5,648,764 A | 7/1997 | Nose et al. |
| 5,883,443 A | 3/1999 | Wilson |
| 5,937,065 A * | 8/1999 | Simon et al. ............... 380/262 |
| 5,952,937 A | 9/1999 | Koopman, Jr. et al. |
| 5,973,611 A * | 10/1999 | Kulha et al. ............... 340/5.62 |
| 5,986,548 A | 11/1999 | McGregor |
| 6,049,268 A | 4/2000 | Flick |
| 6,094,131 A | 7/2000 | Chen et al. |
| 6,243,022 B1 | 6/2001 | Furukawa |
| 6,542,071 B1 * | 4/2003 | Ohtsubo et al. ....... 340/426.28 |

* cited by examiner

Primary Examiner—Jeffery Hofsass
Assistant Examiner—Jennifer Stone
(74) Attorney, Agent, or Firm—Bill C. Panagos

(57) ABSTRACT

In a vehicle passive entry system, a countermeasure system and method include a remote unit for receiving a passive entry challenge signal, determining if the passive entry challenge signal is valid, and transmitting a vehicle access signal for use in actuating a door lock mechanism to permit access to the vehicle if the passive entry challenge signal is determined valid. The remote unit includes an indicator for use in generating an alert if the passive entry challenge signal is determined valid, and a switch for use in manually disabling transmission of the vehicle access signal. The countermeasure system further includes a passive entry control module for mounting in the vehicle, the control module including a transceiver for transmitting the passive entry challenge signal and for receiving the vehicle access signal.

20 Claims, 1 Drawing Sheet

COUNTERMEASURE SYSTEM AND METHOD FOR VEHICLE PASSIVE ENTRY SYSTEM

CROSS REFERENCE TO RELATED APPLICATION

This application claims the benefit of U.S. provisional application Ser. No. 60/385,307, filed Jun. 3, 2002.

BACKGROUND OF THE INVENTION

1. Field of the Invention

The present invention relates to a countermeasure system and method for a vehicle passive entry system.

2. Background

It is well known in the automotive industry to provide for remote vehicle access, such as through the use of remote keyless entry (RKE) systems. RKE systems may be characterized as active or passive in nature. In an active system, a switch or pushbutton on a remote transmitter must be activated by an operator in order to have a desired remote function performed, such as locking or unlocking the vehicle doors. In contrast, in a passive RKE system, no such switch or pushbutton activation by an operator is required in order to have a desired remote function performed.

In passive RKE systems, a remote transceiver is provided, which is commonly referred to as a "fob" or a "card." Such a fob or card may be attached to a key chain as a separate unit, or may be part of an ignition key head. The fob or card automatically transmits radio frequency (RF) signals to a vehicle in order to perform any of a variety of remote vehicle functions, such as unlocking a vehicle door, enabling the vehicle engine, and/or activating internal and/or external vehicle lights.

In that regard, passive RKE systems also include a transceiver and/or control unit installed in the vehicle. The vehicle transceiver and/or control unit is provided in communication with various vehicle devices to remotely perform a variety of functions. For example, the vehicle transceiver and/or control unit may be provided in communication with a door lock mechanism in order to unlock a vehicle door in response to an unlock signal received from the remote transceiver, or may be provided in communication with the vehicle engine in order to start the engine in response to an engine start signal received from the remote transceiver.

In that regard, in a passive RKE system, a sensor may be provided in a vehicle door handle for use in providing automatic unlocking of the vehicle door. More particularly, when the vehicle owner makes physical contact with the door handle, such as by grasping or pulling the handle, such a sensor provides the vehicle transceiver and/or control unit with an indication of such contact. After receiving such an indication, the vehicle transceiver and/or control unit automatically transmits a passive entry challenge signal. Upon receipt of that challenge signal, the remote transceiver fob or card carried by the owner determines if the challenge signal is valid and, if so, automatically transmits a vehicle access signal. Upon receipt of the vehicle access signal, the vehicle transceiver and/or control unit, which is provided in communication with the door lock mechanism, generates a control signal for use in unlocking the vehicle door.

In such a fashion, the vehicle owner is remotely and automatically provided with entry to the vehicle, without the need to actuate any switch or button on the fob or card. Of course, if the vehicle transceiver and/or control unit does not receive a vehicle access signal after transmitting the challenge signal, such as when the door handle is grasped by an individual without an authorized fob or card, the vehicle door remains locked. Similarly, if a fob or card carried by the vehicle owner determines that a received challenge signal is not valid, such as where the owner mistakenly attempts to enter another vehicle, no vehicle access signal is transmitted by the fob or card.

However, it is also known in the automotive industry that various relay attack methods and devices may be employed to gain unauthorized entry to a vehicle equipped with such a passive RKE system. Thus, in a vehicle passive entry system, there exists a need for a countermeasure system and method for deterring such unauthorized entry and vehicle theft.

DISCLOSURE OF THE INVENTION

Accordingly, the present invention provides a countermeasure system and method for use in a passive entry system for a vehicle.

According to one embodiment of the present invention, in a passive entry system for a vehicle having a door lock mechanism and an engine, a countermeasure system is provided. The countermeasure system comprises a passive entry control module for mounting in the vehicle, the control module comprising a transceiver for transmitting a passive entry challenge signal and for receiving a vehicle access signal. The countermeasure system further comprises a remote unit for receiving the passive entry challenge signal, determining if the passive entry challenge signal is valid, and transmitting a vehicle access signal for use in actuating the door look mechanism to permit access to the vehicle if the passive entry challenge signal is determined valid. The remote unit comprises an indicator for use in generating an alert if the passive entry challenge signal is determined valid, and a switch for use in manually disabling transmission of the vehicle access signal.

According to another embodiment of the present invention, in a passive entry system for a vehicle having a door lock mechanism and an engine, a countermeasure method is provided. The countermeasure method comprises providing a remote unit for receiving a passive entry challenge signal, determining if the passive entry challenge signal is valid, and transmitting a vehicle access signal for use in actuating the door look mechanism to permit access to the vehicle if the passive entry challenge signal is determined valid. The remote unit comprises an indicator for use in generating an alert if the passive entry challenge signal is determined valid, and a switch for use in manually disabling transmission of the vehicle access signal.

The following detailed description and accompanying drawings set forth preferred embodiments of the present invention.

DETAILED DESCRIPTION OF PREFERRED EMBODIMENTS

Figure 1:
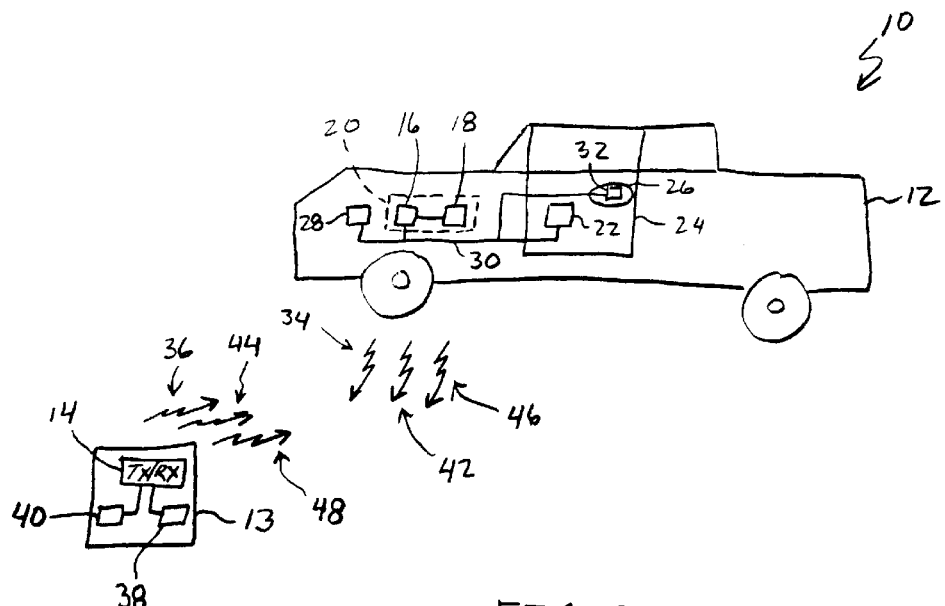
FIG. 1 is a simplified, exemplary block diagram depicting an embodiment of the countermeasure system of the present invention for use in a vehicle passive entry system.

Referring now to Figures, preferred embodiments of the present invention will now be described. As previously noted, it is well known in the automotive industry to provide for remote vehicle access, such as through the use of RKE systems which may be characterized as active or passive in nature. In an active system, a switch or pushbutton on a remote transmitter must be activated by an operator in order to have a desired remote function performed, such as locking or unlocking the vehicle doors. In contrast, in a passive RKE system, no such switch or pushbutton activation by an operator is required in order to have a desired remote function performed.

As also previously noted, in passive RKE systems, a remote transceiver commonly referred to as a "fob" or a "card" is provided, which may be attached to a key chain as a separate unit, or may be part of an ignition key head. The fob or card automatically transmits radio frequency (RF) signals to a vehicle in order to perform any of a variety of remote vehicle functions, such as unlocking a vehicle door, enabling the vehicle engine, and/or activating internal and/or external vehicle lights.

Passive RKE systems also include a transceiver and/or control unit installed in the vehicle. The vehicle transceiver and/or control unit is provided in communication with various vehicle devices to remotely perform a variety of functions. For example, the vehicle transceiver and/or control unit may be provided in communication with a door lock mechanism in order to unlock a vehicle door in response to an unlock signal received from the remote transceiver, or may be provided in communication with the vehicle engine in order to start the engine in response to an engine start signal received from the remote transceiver.

As noted above, in a passive RKE system, a sensor may be provided in a vehicle door handle for use in providing automatic unlocking of the vehicle door. More particularly, when the vehicle owner makes physical contact with the door handle, such as by grasping or pulling the handle, such a sensor provides the vehicle transceiver and/or control unit with an indication of such contact. After receiving such an indication, the vehicle transceiver and/or control unit automatically transmits a passive entry challenge signal. Upon receipt of that challenge signal, the remote transceiver fob or card carried by the owner determines if the challenge signal is valid and, if so, automatically transmits a vehicle access signal. Upon receipt of the vehicle access signal, the vehicle transceiver and/or control unit, which is provided in communication with the door lock mechanism, generates a control signal for use in unlocking the vehicle door.

In such a fashion, the vehicle owner is remotely and automatically provided with entry to the vehicle, without the need to actuate any switch or button on the fob or card. Of course, if the vehicle transceiver and/or control unit does not receive a vehicle access signal after transmitting the challenge signal, such as when the door handle is grasped by an individual without an authorized fob or card, the vehicle door remains locked. Similarly, if a fob or card carried by the vehicle owner determines that a received challenge signal is not valid, such as where the owner mistakenly attempts to enter another vehicle, no vehicle access signal is transmitted by the fob or card.

As also noted above, however, various relay attack methods and devices may be employed to gain unauthorized entry to a vehicle equipped with such a passive RKE system. Thus, in a vehicle passive entry system, there exists a need for a countermeasure system and method for deterring such unauthorized entry and vehicle theft.

In particular, vehicle theft may be attempted by a team of individuals operating in proximity to a vehicle and the vehicle owner carrying an authorized passive entry fob or card. In that regard, after the vehicle owner parks and exits the vehicle, a first member of the team grasps the vehicle door so that the vehicle transceiver and/or control unit generates a challenge signal in the fashion described above. Using a mobile transceiver, that first member relays the challenge signal to second team member in proximity to the vehicle owner. Using a similar mobile transceiver, the second member receives and then transmits the challenge signal for receipt by the passive entry fob or card carried by the vehicle owner. That fob or card, because it determines that the challenge signal is valid, transmits a vehicle access signal. Using the mobile transceivers, that vehicle access signal is relayed back to the vehicle for transmission to the vehicle transceiver and/or control unit which acts to unlock the vehicle door, thereby providing unauthorized access to the vehicle.

Referring now to FIG. 1, a simplified, exemplary block diagram depicting one embodiment of the countermeasure system of the present invention is shown, denoted generally by reference numeral 10. As seen therein, the system (10) is provided for use in a passive entry system for use in a vehicle (12). The passive entry system includes a remote unit (13), such as an RKE fob or card. Remote unit (13) comprises a remote transceiver (14) provided for wirelessly communicating, preferably via radio frequency (RF) signals, with a passive entry controller (16) installed in the vehicle (12). In that regard, controller (16) is provided in communication with a transceiver (18) also mounted in the vehicle (12). It should be noted that controller (16) and transceiver (18) may be provided together as part of a control unit or module (20) for installation in vehicle (12).

Still referring to FIG. 1, controller (16) is preferably provided in communication with a door lock mechanism (22) for use in locking and unlocking a vehicle door (24) having a handle (26). Controller is also preferably provided in communication with vehicle engine (28). In that regard, controller (16) is preferably provided in communication with door lock mechanism (22) and engine (28) via a vehicle bus system (30) and respective control modules (not shown) for door lock mechanism (22) and engine (28), although such communication may alternatively be direct. Controller (16) is still further provided in communication with a sensor (32) in door handle (26). Sensor (32), which may be of any suitable type known in the art, is for sensing physical contact by an individual with door handle (26) and providing an indication of such contact to controller (16). Here again, controller (16) is preferably provided in communication with sensor (32) over vehicle bus system (30), although such communication may alternatively be direct.

As previously described, when the vehicle owner (not shown) grasps door handle (26), sensor (32) provides controller (16) with an indication of such contact. As a result, vehicle transceiver (18) transmits a passive entry challenge signal (34) for receipt by remote transceiver (14). Upon receipt of challenge signal (34), remote unit (13) determines if challenge signal (34) is valid. In that regard, remote unit (13) preferably includes a microprocessor (not shown) and/or other hardware/software well known in the art for performing such a determination. If the challenge signal (34) is determined valid, remote unit (13) uses remote transceiver (14) to transmit a vehicle access signal (36) for receipt by vehicle transceiver (18) and for use in actuating door lock mechanism (22). More specifically, upon receipt of vehicle access signal (36), controller (16) generates a control signal (not shown) for use in actuating door lock mechanism (22) in order to unlock vehicle door (24).

Referring still to FIG. 1, remote unit (13) is also equipped and configured for countermeasure purposes. More particularly, remote unit (13) includes an indicator (38). In order to deter unauthorized entry to and theft of vehicle (12) of the type previously described, indicator (38) is for use in generating an alert perceptible by the vehicle owner that remote unit (13) has received a valid challenge signal (34) from a source. In that regard, such a source could be vehicle transceiver (18) in an ordinary passive entry operation. Alternatively, however, such a source could be a mobile transceiver (not shown) used to relay a valid challenge signal (34) in an attempt to gain unauthorized entry to vehicle (12) as described previously.

Indicator (38) is preferably a buzzer, a speaker, or the like for use in generating an audible alert that a valid challenge signal (34) has been received by remote unit (13). Alternatively, however, indicator (38) may be a motor for, use in generating a tactile alert, such as by vibrating. Indicator (38) may alternatively be a light, such as a light emitting diode (LED), for use in generating a visual alert. Indicator (38) may still further be any combination of the above. In such a fashion, a vehicle owner (not shown) is provided with an indication that remote unit (13) has received a valid challenge signal (34), which will ultimately result in transmission by remote transceiver (14) of a vehicle access signal (36).

Still referring to FIG. 1, remote unit (13) also includes at least one switch or button (40) that is provided for use in disabling transmission of a vehicle access signal (36) by remote transceiver (14). In that regard, if the vehicle owner is not attempting to enter vehicle (12) when an alert is generated, such an alert is an indication that an attempt to gain unauthorized access to vehicle (12) may be in progress. However, by manually actuating switch (40) upon or after perceiving such an alert, the vehicle owner disables remote transceiver (14) from transmitting a vehicle access signal (36), thereby halting the unauthorized access attempt. It should be noted that switch (40) may also be configured to disable transmission of a vehicle access signal (36) by remote transceiver (14) whenever switch (40) is actuated, regardless of whether an alert has been generated by indicator (38), thereby deactivating the vehicle passive entry system. Such deactivation may be accomplished by actuating switch (40) multiple times or, where switch (40) comprises more than one switch or button, actuating multiple switches or buttons. It should still further be noted that switch (40) may also be configured such that actuation of switch (40) can be used to enable/disable generation of an alert by indicator (38).

After receipt of a vehicle access signal (36) and unlocking vehicle door (24), vehicle transceiver (18) and controller (16) may also be configured to transmit a passive engine start challenge signal (42) for use in remotely and automatically starting vehicle engine (28). More specifically, such a passive engine start challenge signal (42) is for receipt by remote transceiver (14). Remote unit (13) determines if passive engine start challenge signal (42) is valid and, if so, uses remote transceiver (14) to transmit an engine start signal (44) for receipt by vehicle transceiver (16). Upon receipt of engine start signal (44), controller (16) generates a control signal (not shown) for use in activating and starting vehicle engine (28).

Similarly, after vehicle (12) reaches a predetermined threshold speed, such as 10 mph for example, controller (16) and vehicle transceiver (18) may be configured to transmit a remote unit challenge signal (46) for use in enabling/disabling vehicle engine (28). Remote unit challenge signal (46) may be transmitted any time after vehicle (12) reaches such a predetermined speed, such as after 10 seconds or any other predetermined time period. More specifically, remote unit challenge signal (46) is for receipt by remote transceiver (14). Remote unit (13) determines if remote unit challenge signal (46) is valid and, if so, uses remote transceiver (14) to transmit a remote unit response signal (48) for receipt by vehicle transceiver (18). Receipt of remote unit response signal (48) permits vehicle engine (28) to continue to operate. However, if remote unit response signal (48) is not received, controller (16) generates a control signal (not shown) for use in disabling or deactivating vehicle engine (28). Preferably, vehicle engine (28) is disabled or deactivated by a gradual reduction of fuel supplied to engine (28). Alternatively, if vehicle (12) is stationary, vehicle engine (28) may be immediately disabled or deactivated.

In a similar fashion to that previously described, passive engine start challenge signal (42), engine start signal (44), remote unit challenge signal (46), and remote unit response signal (48) may also be intercepted and relayed for use in an attempted theft of vehicle (12). However, in a similar fashion to that described above in connection with disabling transmission of a vehicle access signal (36), switch (40) provided on remote unit (13) may also be configured for use in disabling transmission of an engine start signal (44) and/or a remote unit response signal (48) by remote transceiver (14).

That is, if the vehicle owner is not attempting to enter vehicle (12) when an alert is generated, thereby indicating an unauthorized attempt to gain access to vehicle (12), manual actuation of switch (40) disables remote transceiver (14) from transmitting an engine start signal (44) and/or a remote unit response signal (48), thereby halting the unauthorized access attempt by failing to start vehicle engine (28) and/or disabling engine (28). In such a fashion, if the vehicle owner fails to disable transmission of a vehicle access signal (36) by remote transceiver (14), the vehicle owner is provided with further opportunities to halt the attempted theft of vehicle (12) by disabling transmission of an engine start and/or a remote transceiver response signal (44, 48).

Figure 2:
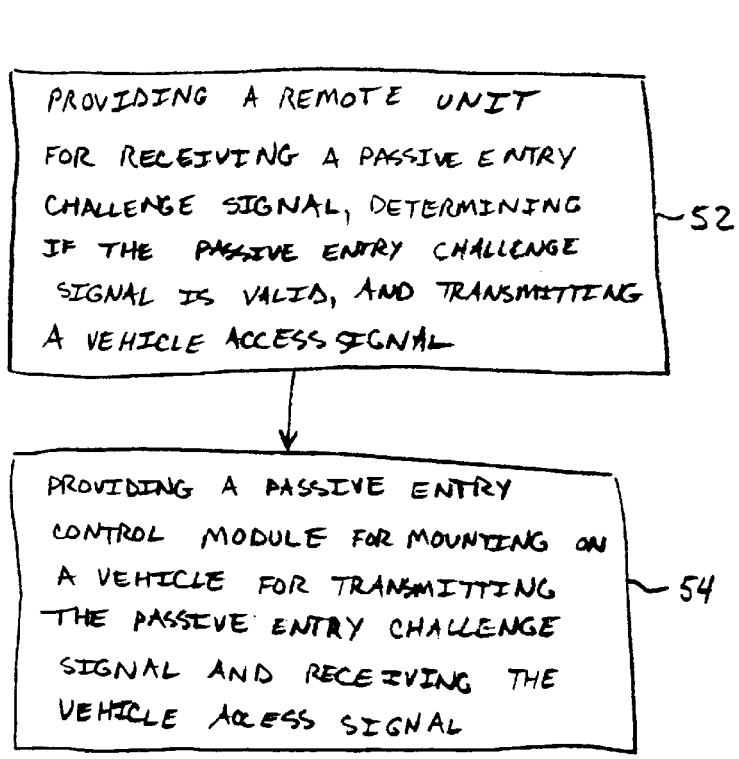
FIG. 2 is a simplified, exemplary flowchart depicting an embodiment of the countermeasure method of the present invention for use in a vehicle passive entry system.

Referring next to FIG. 2, a simplified, exemplary flowchart depicting an embodiment of the countermeasure method of the present invention is shown, denoted generally by reference numeral 50. As seen therein, and with continuing reference to FIG. 1, the countermeasure method (50) is provided for use in a passive entry system for a vehicle (12) including a door lock mechanism (22) and an engine (28).

In that regard, the countermeasure method (50) of the present invention comprises providing (52) a remote unit (13) for receiving a passive entry challenge signal (34), determining if the passive entry challenge signal (34) is valid, and transmitting a vehicle access signal (36) for use in actuating door look mechanism (22) to permit access to vehicle (12) if the passive entry challenge signal (34) is determined valid. It should be noted that remote unit (13) preferably includes a remote transceiver (14) for transmitting and receiving passive entry challenge signal (34) and vehicle access signal (36).

Remote unit (13) also comprises an indicator (38) for use in generating an alert if the passive entry challenge signal (34) is determined valid, and a switch (40) for use in manually disabling transmission of the vehicle access signal (36). The countermeasure method (50) may further comprise providing (54) a passive entry control module (20) for mounting in vehicle (12). Control module (20) comprises a transceiver (18) for transmitting the passive entry challenge signal (34) and for receiving the vehicle access signal (36).

As described in detail above in connection with FIG. 1, indicator (38) may be a buzzer, a speaker, or the like to provide an audible alert, a light, such as an LED, to provide a visual alert, and/or a motor to provide a tactile alert, such as by vibrating. Remote transceiver (14) further comprises a switch (40) for use in manually disabling generation of the alert.

As also described in detail above, remote unit (13) may further be configured to receive a passive engine start challenge signal (42), determine if the passive engine start challenge signal (42) is valid, and transmit an engine start signal (44) for use in starting vehicle engine (28) if the passive engine start challenge signal (42) is determined valid. Remote unit (13) further comprises a switch (40) for use in manually disabling transmission of the engine start signal (44).

In that same regard, vehicle transceiver (16) may further be configured to transmit a remote unit challenge signal (46) after vehicle (12) reaches a predetermined threshold speed and to receive a remote transceiver response signal (48). Remote unit (13) may further be configured to receive the remote unit challenge signal (46), determine if the remote unit challenge signal (46) is valid, and transmit a remote unit response signal (48) if the remote unit challenge signal (46) is determined valid. In that regard, controller (16) is for use in deactivating vehicle engine (28) if vehicle transceiver (18) fails to receive the remote unit response signal (48), and remote unit (13) further comprises a switch (40) for use in manually disabling transmission of the remote transceiver response signal (48).

It should be noted that the simplified flowchart depicted in FIG. 2 is exemplary of the method (50) of the present invention. In that regard, the steps or functions of such method (50) may be executed in sequences other than those shown, including the execution of one or more steps or functions simultaneously.

As is readily apparent from the foregoing description, then, the present invention provides a countermeasure system and method for use in a vehicle equipped with a passive entry system. Such a countermeasure system and method helps to deter relay attack in an attempt to gain unauthorized access to such a vehicle.

While various embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention. Indeed, many alternatives, modifications, and variations will be apparent to those skilled in the art in light of the foregoing description, and the present invention is intended to embrace all such alternatives.

What is claimed is:

1. In a passive entry system for a vehicle having a door lock mechanism and an engine, a countermeasure system comprising:

a passive entry control module for mounting in the vehicle, the control module comprising a transceiver for transmitting a passive entry challenge signal and for receiving a vehicle access signal; and a remote unit for receiving the passive entry challenge signal, determining if the passive entry challenge signal is valid, and transmitting a vehicle access signal for use in actuating the door lock mechanism to permit access to the vehicle if the passive entry challenge signal is determined valid;

wherein the vehicle transceiver is further for transmitting a remote unit challenge signal after the vehicle reaches a predetermined threshold speed and for receiving a remote unit response signal, wherein the remote unit is further for receiving the remote unit challenge signal, determining if the remote unit challenge signal is valid, and transmitting a remote unit response signal if the remote unit challenge signal is determined valid, and wherein the control module is for use in deactivation of the vehicle engine if the vehicle transceiver fails to receive the remote unit response signal.

2. The countermeasure system of claim 1 wherein the vehicle transceiver is further for transmitting a passive engine start challenge signal upon receipt of a vehicle access signal and for receiving an engine start signal, wherein the remote unit is further for receiving the passive engine start challenge signal, determining if the passive engine start challenge signal is valid, and transmitting an engine start signal for use in starting the vehicle engine if the passive engine start challenge signal is determined valid, and wherein the remote unit further comprises a switch for use in manually disabling transmission of the engine start signal.

3. The counter measure system of claim 1 wherein the remote unit further comprises a switch for use in manually disabling transmission of the remote unit response signal.

4. The counter measure system of claim 1 wherein deactivating the vehicle engine comprises gradually reducing fuel supplied to the engine.

5. The countermeasure system of claim 1 wherein the remote unit comprises an indicator for use in generating an alert if the passive entry challenge signal is determined valid.

6. The countermeasure system of claim 5 wherein the remote unit further comprises a switch for use in manually disabling transmission of the vehicle access signal.

7. The countermeasure system of claim 5 wherein the remote unit further comprises a switch for use in manually disabling generation of the alert.

8. The countermeasure system of claim 5 wherein the indicator is a motor and the alert is a vibration of the motor.

9. The countermeasure system claim 5 wherein the indicator is a light emitting diode and the alert is a visual signal.

10. The countermeasure system of claim 5 wherein the indicator is a buzzer and the alert is an audible signal.

11. The counter measure system of claim 6 wherein the switch is operative for disabling transmission of the vehicle access signal after generation of the alert.

12. In a passive entry system for a vehicle having a door lock mechanism and an engine, the passive entry system comprising a control module for mounting in the vehicle, the control module having a transceiver for transmitting a passive entry challenge signal and for receiving a vehicle access signal, a countermeasure method comprising:

providing a remote unit for receiving the passive entry challenge signal, determining if the passive entry challenge signal is valid, and transmitting the vehicle access signal for use in actuating the door lock mechanism to permit access to the vehicle if the passive entry challenge signal is determined valid;

wherein the vehicle transceiver is further for transmitting a remote unit challenge signal after the vehicle reaches a predetermined threshold speed and for receiving a remote unit response signal, wherein the remote unit is further for receiving the remote unit challenge signal, determining if the remote unit challenge signal is valid, and transmitting a remote unit response signal if the remote unit challenge signal is determined valid, and wherein the control module is for use in deactivation of the vehicle engine if the vehicle transceiver fails to receive the remote unit response signal.

13. The countermeasure method of claim 12 wherein the remote unit is further for receiving a passive engine start challenge signal, determining if the passive engine start challenge signal is valid, and transmitting an engine start signal for use in starting the vehicle engine if the passive engine start challenge signal is determined valid, and wherein the remote unit further comprises a switch for use in manually disabling transmission of the engine start signal.

14. The countermeasure method of claim 12 wherein the remote unit further comprises a switch for use in manually disabling transmission of the remote unit response signal.

15. The countermeasure method of claim 12 wherein the remote unit comprises an indicator for use in generating an alert if the passive entry challenge signal is determined valid.

16. The countermeasure method of claim 15 wherein the indicator is a buzzer and the alert is an audible signal.

17. The countermeasure method of claim 15 wherein the indicator is a light emitting diode and the alert is a visual signal.

18. The countermeasure method of claim 15 wherein the indicator is a motor and the alert is a vibration of the motor.

19. The countermeasure method of claim 15 wherein the remote unit further comprises a switch for use in manually disabling generation of the alert.

20. The countermeasure method of claim 15 wherein the remote unit further comprises a switch for use in manually disabling transmission of the vehicle access signal.

* * * * *